(12) United States Patent
Sun et al.

(10) Patent No.: US 9,184,599 B2
(45) Date of Patent: Nov. 10, 2015

(54) GUNSTOCK FOR BB BULLET GUN

(71) Applicant: Huanic Corporation, Xi'an (CN)

(72) Inventors: Jianhua Sun, Xi'an (CN); Chen Gong, Xi'an (CN); Xuewen Cheng, Xi'an (CN); Dong Wang, Xi'an (CN)

(73) Assignee: Huanic Corporation, Xi'an (CN)

( * ) Notice: Subject to any disclaimer, the term of this patent is extended or adjusted under 35 U.S.C. 154(b) by 429 days.

(21) Appl. No.: 13/664,860

(22) Filed: Oct. 31, 2012

(65) Prior Publication Data

US 2013/0234657 A1    Sep. 12, 2013

(30) Foreign Application Priority Data

Mar. 8, 2012    (CN) ...................... 2012 2 0200539 U (51) Int. Cl.
| | | |
|---|---|---|
| *H02J 7/00* | (2006.01) | |
| *F41A 17/00* | (2006.01) | |
| *F41A 19/00* | (2006.01) | |
| *F41A 19/58* | (2006.01) | |
| *F41A 17/36* | (2006.01) | |
| *F41C 23/22* | (2006.01) | |
| *H02J 5/00* | (2006.01) | |
| *H02J 7/02* | (2006.01) | |

(52) U.S. Cl.
CPC . *H02J 7/00* (2013.01); *F41A 17/36* (2013.01); *F41A 19/58* (2013.01); *F41C 23/22* (2013.01); *H02J 5/005* (2013.01); *H02J 7/025* (2013.01)

(58) Field of Classification Search
CPC ......... F41A 17/02; F41A 17/04; F41A 17/06; F41A 17/44; F41A 17/46; F41A 17/56; F41A 19/58; F41A 35/00; F41A 17/063; F41A 17/36; F41A 17/38; F41C 23/22; F41C 9/04; F41C 3/02; H02J 7/00; H02J 7/025; H02J 7/0042
USPC ........ 320/108; 42/84, 88, 89, 70.02; 89/28.05
See application file for complete search history.

(56) References Cited

U.S. PATENT DOCUMENTS

| | | | | |
|---|---|---|---|---|
| 3,710,496 A | * | 1/1973 | Packmayr et al. | 42/71.01 |
| 3,982,347 A | * | 9/1976 | Brandl et al. | 42/84 |
| 4,120,017 A | * | 10/1978 | Sickles | 361/228 |
| 4,835,621 A | * | 5/1989 | Black | 386/358 |
| 5,561,359 A | * | 10/1996 | Matsuura et al. | 180/68.2 |

(Continued)

*Primary Examiner* — M'Baye Diao
(74) *Attorney, Agent, or Firm* — Nancy J. Flint, Esq.; Nancy J. Flint, Attorney At Law, P.A.

(57) ABSTRACT

The invention provides a gunstock for BB bullet gun, comprising a gunstock body, a battery compartment provided in the gunstock body for holding a rechargeable battery, and a rear cover arranged at the rear end of the body, wherein the battery compartment is provided at the front end thereof with a fast locking conductive device; the rear cover is provided with a charging coil for charging the rechargeable battery; the charging coil contacts the rechargeable battery via a conductive elastic plate. The charging mode is changed because the rechargeable battery in the art is replaced by a wireless rechargeable battery. The battery does not need to be dismantled and taken out when charging, so that the charging becomes simple and easy to be operated. In addition, the fast locking conductive device arranged at the front end of the battery compartment and the conductive elastic plate arranged on the rear cover overcome the defects of space occupation and disorder caused by a relatively long wire needed in the art. Therefore, the invention has advantages of simple and convenient operation of charging, and compact structure.

20 Claims, 4 Drawing Sheets

(56) References Cited

U.S. PATENT DOCUMENTS

| | | | |
|---|---|---|---|
| 6,354,033 B1 * | 3/2002 | Findley | 42/84 |
| 6,412,207 B1 * | 7/2002 | Crye et al. | 42/70.06 |
| 7,033,204 B1 * | 4/2006 | Wang | 439/372 |
| 7,065,915 B2 * | 6/2006 | Chang | 42/84 |
| 7,456,608 B2 * | 11/2008 | Kageler et al. | 320/114 |
| 7,562,480 B2 * | 7/2009 | Mauch et al. | 42/70.01 |
| 7,827,720 B1 * | 11/2010 | Erdem | 42/70.08 |
| 8,322,329 B1 * | 12/2012 | Sikes | 124/73 |
| 8,330,284 B2 * | 12/2012 | Weston et al. | 290/1 R |
| 2001/0032407 A1 * | 10/2001 | Cain et al. | 42/70.11 |
| 2002/0069570 A1 * | 6/2002 | Lee | 42/70.11 |
| 2006/0206100 A1 * | 9/2006 | Eskridge et al. | 606/1 |
| 2007/0107592 A1 * | 5/2007 | Snow | 89/33.02 |
| 2008/0039962 A1 * | 2/2008 | McRae | 700/90 |
| 2010/0000505 A1 * | 1/2010 | Yeh | 124/51.1 |
| 2011/0030667 A1 * | 2/2011 | Lin | 124/52 |
| 2012/0235633 A1 * | 9/2012 | Kesler et al. | 320/108 |
| 2015/0115880 A1 * | 4/2015 | Soar | 320/108 |

* cited by examiner

GUNSTOCK FOR BB BULLET GUN

TECHNICAL FIELD OF THE INVENTION

The invention belongs to a toy firearms technology, and particularly relates to a gunstock for BB bullet gun.

BACKGROUND OF THE INVENTION

The power supply of a BB bullet gun depends on a rechargeable battery mounted in a battery compartment which is on the top of the gunstock. A wire connected with power supply wire of the rechargeable battery is provided in the battery compartment, and the wire is connected with the battery compartment by a pluggable connector. The disadvantage in this manner is that the connector needs to be pulled out when charging. In use, the wire in the battery compartment needs to be pulled out, and then the battery is inserted into the battery compartment after a socket on the power supply wire of the rechargeable battery is connected with a plug on the wire thereof. So the operation is rather troublesome and inefficient. In addition, the wire in the battery compartment is relatively long, which occupies space and results in a relatively big structure.

SUMMARY OF THE INVENTION

The purpose of the invention is to solve the problems of the gunstock for the BB bullet in the art, which are the rather troublesome operation of charging, space occupation and relatively large structure caused by a relatively long wire in a battery compartment.

To achieve the purpose above, the invention provides a gunstock for BB bullet gun, comprising a gunstock body, a battery compartment provided in the gunstock body for holding a rechargeable battery, and a rear cover arranged at the rear end of the body, wherein the battery compartment is provided at the front end thereof with a fast locking conductive device; the rear cover is provided with a charging coil for charging the rechargeable battery; the charging coil contacts the rechargeable battery via a conductive elastic plate.

The invention provides a gunstock for BB bullet gun, comprising a gunstock body, a battery compartment provided in the gunstock body for holding a rechargeable battery, and a rear cover arranged at the rear end of the body, wherein the battery compartment is provided at the front end thereof with a fast locking conductive device; the rear end face of the rechargeable battery is provided with a charging coil for wireless charging.

Further, the rear end is provided with at least a magnetic steel.

Further, the upper and lower ends of the rear cover are respectively provided with a magnetic steel.

Further, the rechargeable battery at the upper and lower ends of the charging coil is respectively provided at the rear end faces thereof with a magnetic steel.

Further, the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member; the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference; provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface; provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces; the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring; the first spring is mounted around the screw rod of the fixing bolt; the moveable member is mounted around the first spring; the screw rod of the fixing bolt passes through the circular central hole of the annular stop ring and is connected with the cylinder via the screw hole.

Further, there are four rib strips, four chutes, four big protruding surfaces, four small protruding surfaces and four protruding ribs; the length of the chute is greater than the length of the protruding rib or the rib strip.

Further, provided at the side walls of the concave surface on the front and rear sides of the left jack are respective a bump; the second fixing base corresponding to the bumps is provided with grooves matched with the bumps.

Further, a second spring is arranged between the first fixing base and the second fixing base; the two ends of the second spring are mounted around the first round pipe, and the outer diameter of the second spring is smaller than the diameter of the round concave surface.

The advantages of the invention are described as follows. The charging mode is changed because the rechargeable battery in the art is replaced by a wireless rechargeable battery. The battery does not need to be dismantled and taken out when charging, so that the charging becomes simple and easy to be operated. In addition, the fast locking conductive device arranged at the front end of the battery compartment and the conductive elastic plate arranged on the rear cover overcome the defects of space occupation and disorder caused by a relatively long wire needed in the art. Therefore, the invention has advantages of simple and convenient operation of charging, and compact structure.

BRIEF DESCRIPTION OF THE DRAWINGS

The invention will be further described in details as follows in combination with the drawings.

In the figures: 1. body; 2. rechargeable battery; 3. battery compartment; 4. rear cover; 5. fast locking conductive device; 6. charging coil; 7. conductive elastic plate; 8, 9. magnetic steel; 10. first fixing base; 11. second fixing base; 12. fixing bolt; 13. first spring; 14. moveable member; 15, 16. jack; 17, 18. plug; 19. first base; 20. concave surface; 21. round concave surface; 22. first round pipe; 23. first sawteeth; 24. rib strip; 25. cylinder; 26. screw hole; 27. second round pipe; 28, 30. big protruding surface; 29. small protruding surface; 31. chute; 32, 33. inclined plane; 34. annular stop ring; 35. third round pipe; 36. protruding rib; 37. second sawteeth; 38. inclined guiding plane; 39. screw rod; 40, 41. bump; 42, 43. groove; 44. second spring.

DETAILED DESCRIPTION OF THE EMBODIMENTS

Figure 1:
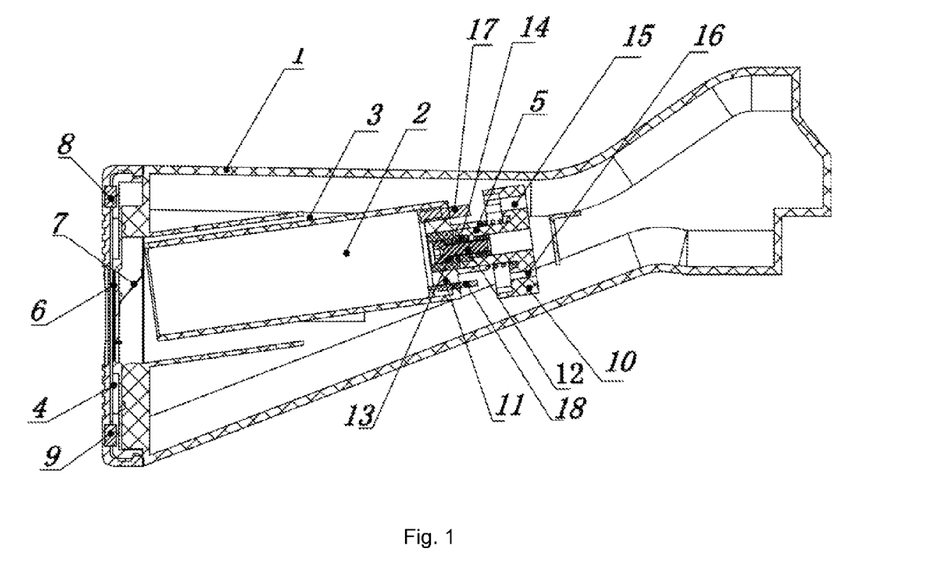
FIG. 1 is a structural diagram illustrating a gunstock for BB bullet gun provided by the invention.

In order to solve the problems of the gunstock for the BB bullet in the art, which are the rather troublesome operation of charging, space occupation and relatively large structure caused by a relatively long wire in a battery compartment, the embodiment provides a gunstock for BB bullet gun shown in FIG. 1, which comprises a gunstock body 1, a battery compartment 3 provided in the gunstock body for holding a rechargeable battery 2, and a rear cover 4 arranged at the rear end of the body 1. The battery compartment 3 is provided at the front end thereof with a fast locking conductive device 5. The rear cover 4 is provided with a charging coil 6 for charging the rechargeable battery 2. The charging coil 6 contacts the rechargeable battery 2 via a conductive elastic plate 7. In order to ensure that the rechargeable battery 2 is in the charging range of a charging base when charging, the upper and lower ends of the rear cover 4 are provided with magnetic steels 8, 9 for locating.

Figure 2:
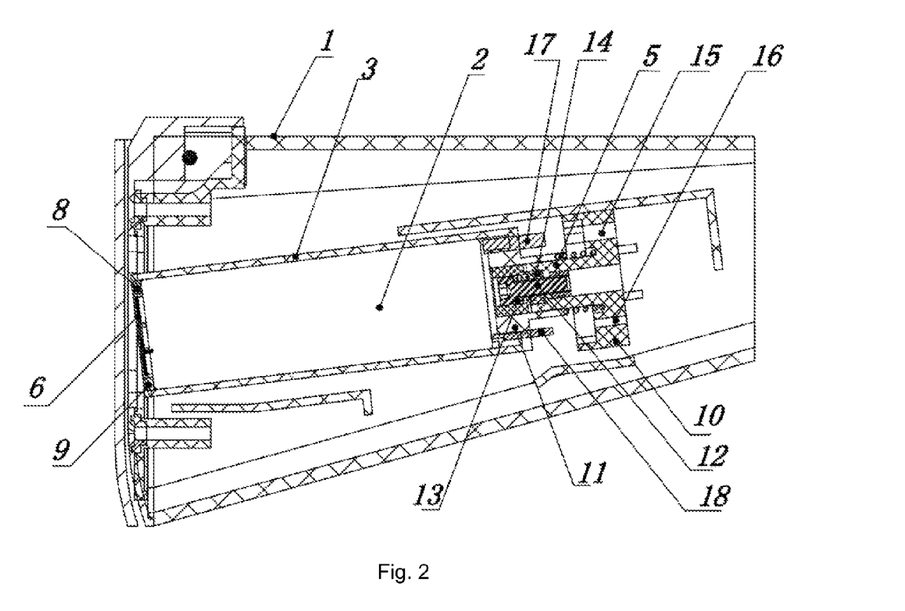
FIG. 2 is a structural diagram illustrating another gunstock for BB bullet gun.
Figure 3:
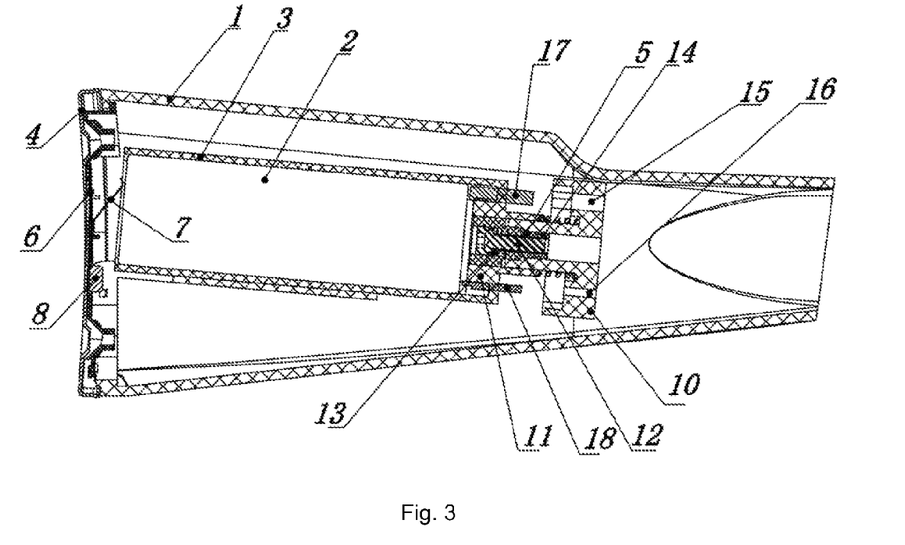
FIG. 3 is another structural diagram of the application of the gunstock for BB bullet gun having a structure form shown in FIG. 1.

At the same time, a gunstock for BB bullet gun provided by the embodiment, shown in FIG. 2, comprises a gunstock body 1, a battery compartment 3 provided in the gunstock body for holding a rechargeable battery 2, and a rear cover 4 arranged at the rear end of the body 1. The front end of the battery compartment 3 is provided with a fast locking conductive device 5. The rechargeable battery 2 is provided at the rear end thereof with a charging coil 6 for wireless charging. Similarly, in order to ensure that the rechargeable battery 2 is in the charging range of the charging base when charging, the rechargeable battery 2 arranged at the upper and lower ends of the charging coil 6 is provided at the rear end faces thereof with magnetic steels 8, 9 for locating.

Figure 4:
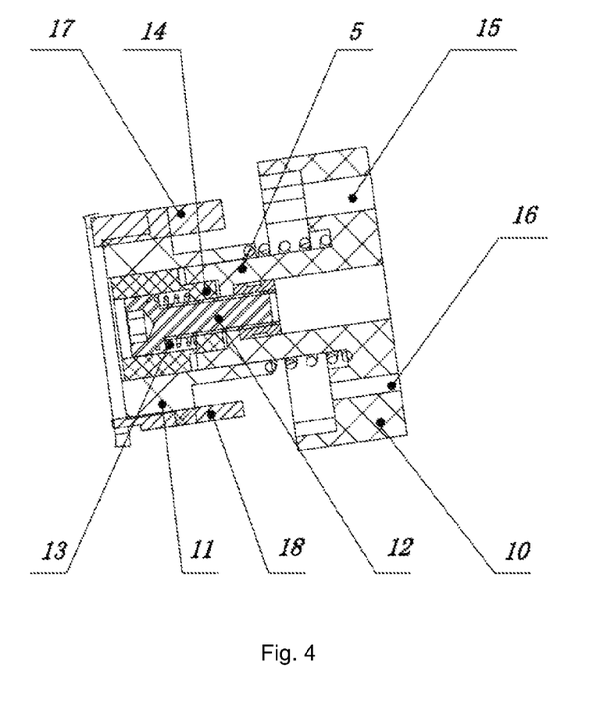
FIG. 4 is an enlarged view of a fast locking conductive device.

It can be seen in combination with FIG. 4 that, one of the structures of the fast locking conductive device provided by the embodiment comprises: a first fixing base 10 arranged in the body 1 and facing the front end of the battery compartment 3, a second fixing base 11 arranged at the front end of the battery compartment 3 and facing the first fixing base 10, a fixing bolt 12, a first spring 13 mounted around the fixing bolt 12, and a moveable member 14. Jacks 15, 16 are arranged on the first fixing base 10, and plugs 17, 18 are arranged at the position corresponding to the jacks 15, 16 of the second fixing base 11.

Figure 5:
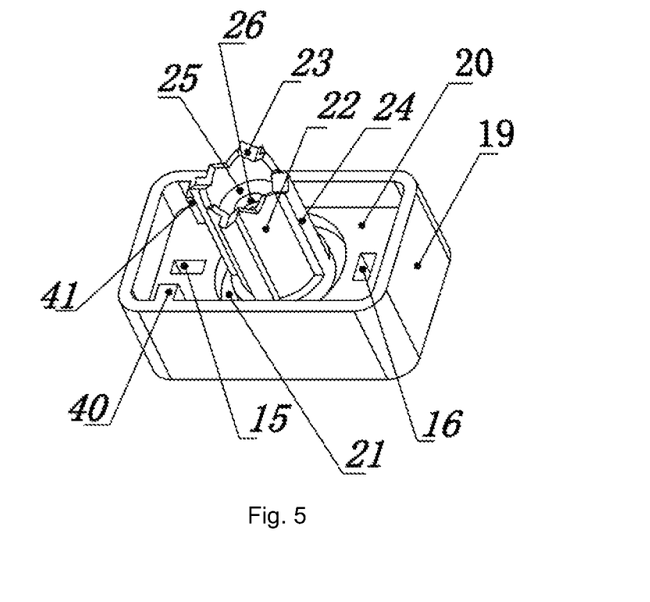
FIG. 5 is a structural diagram of a first fixing base.

It can be seen clearly from FIG. 5 that the first fixing base 10 comprises a first base 19 and a concave surface 20 arranged on the first base 19 and facing the second fixing base 11. A round concave surface 21 is arranged in the central portion of the concave surface 20. The round concave surface 21 is provided with a first round pipe 22. Provided at the top end of the first round pipe 22 are a plurality of first sawtooth 23 arranged in circumference. Provided at the outer surface of the first round pipe 23 are a plurality of rib strips 24 extending axially and arranged in circumference at equal intervals. A cylinder 25 is arranged in the first round pipe 22, and the height of the cylinder 25 is smaller than the height of the first round pipe 22. A screw hole 26 is arranged at the centre of the cylinder 25. Provided at the concave surfaces 20 on the left and on the right of the first round pipe 22 are a left jack 15 and a right jack 16. The left jack 15 is located on the left of the round concave surface 21 and the right jack 16 is located on the right of the round concave surface 21.

Figure 6:
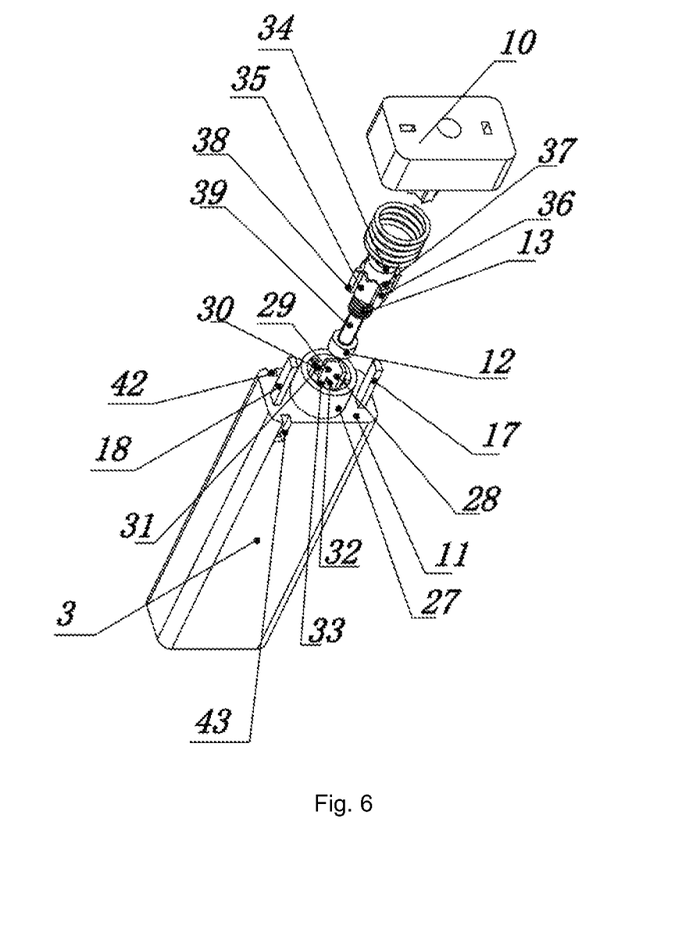
FIG. 6 is an exploded view of the fast locking conductive device.

As shown in FIG. 6, provided on the surface of the second fixing base 11, facing the first fixing base 10, are a second round pipe 27 corresponding to the first round pipe 22, as well as a left plug 17 and a right plug 18 matched with the left jack 15 and the right jack 16. Provided at the inner surface of the second round pipe 27 is a plurality of big protruding surfaces 28 extending axially and arranged in circumference at equal intervals. A small protruding surface 29 is arranged adjacent to the left side of each big protruding surface 28. A chute 31 is arranged between the small protruding surface 29 and the big protruding surface 30 at the left side of the small protruding surface. The width of the big protruding surfaces 28, 30 is greater than the width of the small protruding surfaces 29. The length of the big protruding surfaces 28, 30 is the same as the length of the small protruding surfaces 29. Both the bottoms of the big protruding surfaces 28, 30 and the bottoms of the small protruding surfaces 29 are provided with an inclined plane 32, 33 extending from the left upper side to the right lower side. The inclined planes on the big protruding surfaces 28, 30 are higher than the inclined planes 33 on the small protruding surfaces 29.

The moveable member 14 is a third round pipe 35 provided with an annular stop ring 34 at the bottom thereof. Provided at the outer surface of the third round pipe 35 are protruding ribs 36 matched with the chutes 31. A plurality of second sawtooth 37 matched with the first sawtooth 23 are provided at the top of the protruding ribs 36. The bottom of the protruding rib 36 forms an inclined guiding plane 38 extending from the centerline of the protruding rib to the left and right upper sides of the protruding rib. The diameter of the circular central hole of the annular stop ring 34 is greater than the diameter of a screw rod 39 of the fixing bolt 12, and smaller than the outer diameter of the first spring 13. The first spring 13 is mounted around the screw rod 39 of the fixing bolt 12. The moveable member 14 is mounted around the first spring 13. The screw rod 39 of the fixing bolt 12 passes through the circular central hole of the annular stop ring 34 and is connected with the cylinder 25 via the screw hole 26.

There are four rib strips 24, four chutes 31, four big protruding surfaces 28, four small protruding surfaces 29 and four protruding ribs 36. The length of the chute 31 is greater than the length of the protruding rib 36 or the rib strip 24, which may ensure that the protruding rib 36 and the rib strip 24 are inserted into the chute 31 at the same time, except that one is inserted completely while the other is inserted partially.

Provided at the side walls of the concave surface 20 on the front and rear sides of the left jack 15 are respectively a bump 40, 41. The second fixing base 11 corresponding to the bumps 40, 41 is provided with grooves 42, 43 matched with the bumps 40, 41.

In order to detach the battery compartment conveniently and avoid over-tight locking, a second spring 44 is arranged between the first fixing base 10 and the second fixing base 11. The two ends of the second spring 44 are mounted around the first round pipe 22, and the outer diameter of the second spring is smaller than the diameter of the round concave surface 21.

The working process of the fast locking conductive device provided by the embodiment is described as follows.

1. The locking process is described as follows. Push the battery compartment 3 in the direction of the first fixing base 10 to drive the second fixing base 11 to move towards the first fixing base 10. Under the pressure by the first fixing base 10, the moveable member 14 is guided by the protruding ribs 36 on the outer surface of the moveable member to move towards the bottom surface of the second fixing base 11 along the chutes 32 on the inner surface of the second fixing base 11. When the inclined guiding planes 38 at the bottom of the protruding ribs 36 contact the inclined guiding planes 33 at the bottom of the inner surface of the second fixing base 11, since the inclined guiding planes 38 can match the inclined guiding planes 32, the moveable member 14 begins to rotate under the acting force of the first spring 13. The inclined guiding planes 38 slide to the top end of the inclined guiding planes 32 along the surface of the inclined guiding planes 32 and are blocked by the inclined guiding planes 33. The deformation of the first spring 13 is maintained, the distance between the second fixing base 10 and the first fixing base 11 is reduced, and the plugs 17, 18 are inserted into the sockets 15, 16. Hereto, the locking of the battery compartment 3 and the connection of the power source are completed.

2. The process of dismantling or taking out the battery compartment 3 is described as follows. Once again push the battery compartment 3 in the direction of the second fixing base 10 to drive the second fixing base 11 to move towards the first fixing base 10. Under the pressure by the first fixing base 10, the moveable member 14 is guided by the protruding ribs 36 on its outer surface and the first fixing base 10 is guided by the rib strips 24 on its outer surface to move towards the bottom surface of the second fixing base 11 along the chutes 32 on the inner surface of the second fixing base. In the moving process, the first spring 13 is pressed and the moveable member 14 continues to move towards the bottom surface of the second fixing base 11. When the guiding planes 38 on the moveable member contact the inclined guiding planes 33 of the bottom of the inner surface of the second fixing base 11, the moveable member 14 begins to rotate under the acting force of the first spring 13. The inclined guiding planes 38 slide along the surface of the inclined guiding surfaces 33 to the left side thereof. Since there is no blockage on the left side, and there are the chutes 31 on the left side, the moveable member 14 is guided into the chutes 31, and then the protruding ribs 36 on the moveable member slide along the chutes 31 and move towards the top surface of the second fixing base 11 under the action of the first spring 13, and push the first fixing base 10 apart from the second fixing base 11. The plugs 17, 18 are separated from the sockets 15, 16, and taking the battery compartment 3 out is completed and disconnection of the power source is realized.

The examples above are only illustration of the invention and do not limit the protection scope of the invention. All designs which are the same as or similar to the invention are in the protection scope of the invention.

What is claimed is:

1. A gunstock for BB bullet gun, comprising a gunstock body, a battery compartment provided in the gunstock body for holding a rechargeable battery, and a rear cover arranged at the rear end of the body, wherein the battery compartment is provided at the front end thereof with a fast locking conductive device; the rear cover is provided with a charging coil for charging the rechargeable battery; the charging coil contacts the rechargeable battery via a conductive elastic plate.

2. A gunstock for BB bullet gun, comprising a gunstock body, a battery compartment provided in the gunstock body for holding a rechargeable battery, the rechargeable battery comprising a rear end face proximal to the rear end of the gunstock body, and a rear cover arranged at the rear end of the gunstock body, wherein the battery compartment is provided at the front end thereof with a fast locking conductive device; and the rear end face of the rechargeable battery is provided with a charging coil for wireless charging.

3. The gunstock for BB bullet gun according to claim 1, wherein the rear end is provided with at least a magnetic steel.

4. The gunstock for BB bullet gun according to claim 3, wherein the upper and lower ends of the rear cover are respectively provided with a magnetic steel.

5. The gunstock for BB bullet gun according to claim 2, wherein the charging coil comprises an upper end and a lower end proximal to an upper end and a lower end of the rear end face of the rechargeable battery, wherein the rechargeable battery at the upper and lower ends of the charging coil is respectively provided at the rear end face thereof with a magnetic steel.

6. The gunstock for BB bullet gun according to claim 1, wherein the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member;

the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference; provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface;

provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces;

the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring;

the first spring is mounted around the screw rod of the fixing bolt; the moveable member is mounted around the first spring; the screw rod of the fixing bolt passes through the circular central hole of the annular stop ring and is connected with the cylinder via the screw hole.

7. The gunstock for BB bullet gun according to claim 6, wherein there are four rib strips, four chutes, four big protruding surfaces, four small protruding surfaces and four protruding ribs; the length of the chute is greater than the length of the protruding rib or the rib strip.

8. The gunstock for BB bullet gun according to claim 6, wherein provided at the side walls of the concave surface on the front and rear sides of the left jack are respectively a bump; the second fixing base corresponding to the bumps is provided with grooves matched with the bumps.

9. The gunstock for BB bullet gun according to claim 8, wherein a second spring is arranged between the first fixing base and the second fixing base; the two ends of the second spring are mounted around the first round pipe, and the outer diameter of the second spring is smaller than the diameter of the round concave surface.

10. The gunstock for BB bullet gun according to claim 7, wherein provided at the side walls of the concave surface on the front and rear sides of the left jack are respectively a bump; the second fixing base corresponding to the bumps is provided with grooves matched with the bumps.

11. The gunstock for BB bullet gun according to claim 10, wherein a second spring is arranged between the first fixing base and the second fixing base; the two ends of the second spring are mounted around the first round pipe, and the outer diameter of the second spring is smaller than the diameter of the round concave surface.

12. The gunstock for BB bullet gun according to claim 2, wherein the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member;

the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference;

provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface;

provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces;

the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring;

the first spring is mounted around the screw rod of the fixing bolt; the moveable member is mounted around the first spring; the screw rod of the fixing bolt passes through the circular central hole of the annular stop ring and is connected with the cylinder via the screw hole.

13. The gunstock for BB bullet gun according to claim 12, wherein there are four rib strips, four chutes, four big protruding surfaces, four small protruding surfaces and four protruding ribs; the length of the chute is greater than the length of the protruding rib or the rib strip.

14. The gunstock for BB bullet gun according to claim 12, wherein provided at the side walls of the concave surface on the front and rear sides of the left jack are respectively a bump; the second fixing base corresponding to the bumps is provided with grooves matched with the bumps.

15. The gunstock for BB bullet gun according to claim 14, wherein a second spring is arranged between the first fixing base and the second fixing base; the two ends of the second spring are mounted around the first round pipe, and the outer diameter of the second spring is smaller than the diameter of the round concave surface.

16. The gunstock for BB bullet gun according to claim 13, wherein provided at the side walls of the concave surface on the front and rear sides of the left jack are respectively a bump; the second fixing base corresponding to the bumps is provided with grooves matched with the bumps.

17. The gunstock for BB bullet gun according to claim 16, wherein a second spring is arranged between the first fixing base and the second fixing base; the two ends of the second spring are mounted around the first round pipe, and the outer diameter of the second spring is smaller than the diameter of the round concave surface.

18. The gunstock for BB bullet gun according to claim 3, wherein the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member;

the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference; provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface;

provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces;

the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring;

the first spring is mounted around the screw rod of the fixing bolt; the moveable member is mounted around the first spring; the screw rod of the fixing bolt passes through the circular central hole of the annular stop ring and is connected with the cylinder via the screw hole.

19. The gunstock for BB bullet gun according to claim 4, wherein the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member;

the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference; provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface;

provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces;

the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring;

the first spring is mounted around the screw rod of the fixing bolt; the moveable member is mounted around the first spring; the screw rod of the fixing bolt passes through the circular central hole of the annular stop ring and is connected with the cylinder via the screw hole.

20. The gunstock for BB bullet gun according to claim 5, wherein the fast locking conductive device comprises: a first fixing base arranged in the body and facing the front end of the battery compartment, a second fixing base arranged at the front end of the battery compartment and facing the first fixing base, a fixing bolt, a first spring mounted around the fixing bolt, and a moveable member;

the first fixing base comprises a first base and a concave surface arranged on the first base and facing the second fixing base; a round concave surface is arranged in the central portion of the concave surface; the round concave surface is provided with a first round pipe; provided at the top end of the first round pipe are a plurality of first sawtooth arranged in circumference; provided at the outer surface of the first round pipe are a plurality of rib strips extending axially and arranged in circumference at equal intervals; a cylinder is arranged in the first round pipe and the height of the cylinder is smaller than the height of the first round pipe; a screw hole is arranged at the center of the cylinder; provided at the concave surface on the left and on the right of the first round pipe are a left jack and a right jack; the left jack is located on the left of the round concave surface and the right jack is located on the right of the round concave surface;

provided on the surface of the second fixing base facing the first fixing base are a second round pipe corresponding to the first round pipe as well as a left plug and a right plug matched with the left jack and the right jack; provided at the inner surface of the second round pipe is a plurality of big protruding surfaces extending axially and arranged in circumference at equal intervals; a small protruding surface is arranged adjacent to the left side of each big protruding surface; a chute is arranged between the small protruding surface and the big protruding surface at the left side of the small protruding surface; the width of the big protruding surfaces is greater than the width of the small protruding surfaces; the length of the big protruding surfaces is the same as the length of the small protruding surfaces; both the bottoms of the big protruding surfaces and the bottoms of the small protruding surfaces are each provided with an inclined plane extending from the left upper side to the right lower side; the inclined planes on the big protruding surfaces are higher than the inclined planes on the small protruding surfaces;

the moveable member is a third round pipe provided with an annular stop ring at the bottom thereof; provided at the outer surface of the third round pipe are protruding ribs matched with the chutes; a plurality of second sawtooth matched with the first sawtooth are provided at the top of the protruding ribs; the bottom of the protruding rib forms an inclined guiding plane extending from the centerline of the protruding rib to the left and right upper sides of the protruding rib; the diameter of the circular central hole of the annular stop ring is greater than the diameter of a screw rod of the fixing bolt, and smaller than the outer diameter of the first spring;

the first spring is mounted around the screw rod of the fixing bolt; the moveable member is mounted around the first spring; the screw rod of the fixing bolt passes through the circular central hole of the annular stop ring and is connected with the cylinder via the screw hole.

\* \* \* \* \*